(12) United States Patent
Tanaka (10) Patent No.: US 9,965,707 B2
(45) Date of Patent: May 8, 2018

(54) INFORMATION PROCESSING APPARATUS, INFORMATION PROCESSING SYSTEM, AND INFORMATION PROCESSING METHOD

(71) Applicant: Satoru Tanaka, Tokyo (JP)

(72) Inventor: Satoru Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/428,119

(22) Filed: Feb. 8, 2017

(65) Prior Publication Data

US 2017/0243092 A1 Aug. 24, 2017

(30) Foreign Application Priority Data

Feb. 24, 2016 (JP) .................................. 2016-032872

(51) Int. Cl.
*G06F 3/12* (2006.01)
*G06K 15/02* (2006.01)

(52) U.S. Cl.
CPC ......... *G06K 15/1868* (2013.01); *G06F 3/125* (2013.01); *G06F 3/1206* (2013.01); *G06F 3/1242* (2013.01); *G06F 3/1247* (2013.01)

(58) Field of Classification Search
None
See application file for complete search history.

(56) References Cited

U.S. PATENT DOCUMENTS

| | | | | |
|---|---|---|---|---|
| 8,818,015 B2* | 8/2014 | Nakagata | ................ | G09C 5/00 382/100 |
| 2003/0063319 A1* | 4/2003 | Umeda | ................. | G06K 15/02 358/3.28 |
| 2004/0042038 A1* | 3/2004 | Uejo | ..................... | G06K 15/00 358/1.15 |
| 2004/0062561 A1* | 4/2004 | Higuchi | ............ | G03G 15/0131 399/82 |
| 2005/0281184 A1* | 12/2005 | Sakata | .................... | B26D 5/00 369/275.3 |
| 2005/0286922 A1* | 12/2005 | Oki | ...................... | H04N 1/0058 399/75 |
| 2007/0258744 A1* | 11/2007 | Liccini | ................ | G03G 15/231 400/62 |
| 2010/0225932 A1* | 9/2010 | Kurose | ............. | G03G 15/0131 358/1.1 |
| 2012/0014703 A1* | 1/2012 | Karasawa | ............ | G03G 15/238 399/49 |

(Continued)

FOREIGN PATENT DOCUMENTS

| | | | | |
|---|---|---|---|---|
| AP | 2014-199246 | | 10/2014 | |
| JP | 2005-223381 | | 8/2005 | |
| JP | 2007-206667 | * | 8/2007 | ............ G03G 15/36 |

*Primary Examiner* — Beniyam Menberu
(74) *Attorney, Agent, or Firm* — Duft Bornsen & Fettig LLP (57) ABSTRACT

An image forming apparatus includes an engine including circuitry that expands first image data, converts the expanded first image data into second image data in a format printable by the image forming apparatus, adds a positioning element to the second image data, the positioning element to be used for correcting positions of a first image and a second image, and controls a mechanical system of the image forming apparatus to print the second image data.

3 Claims, 10 Drawing Sheets

(56) References Cited

U.S. PATENT DOCUMENTS

| | | | |
|---|---|---|---|
| 2013/0328957 A1* | 12/2013 | Teshigawara | B41J 11/008 347/14 |
| 2014/0307020 A1* | 10/2014 | Toriihara | B41J 11/663 347/16 |
| 2014/0341437 A1 | 11/2014 | Araki et al. | |
| 2015/0183214 A1* | 7/2015 | Yasuzaki | B41J 2/16579 347/9 |

* cited by examiner

INFORMATION PROCESSING APPARATUS, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2016-032872, filed on Feb. 24, 2016 in the Japan Patent Office, the entire disclosure of which is hereby incorporated by reference herein.

BACKGROUND

Technical Field

The present invention relates to an information processing apparatus, an information processing system, and an information processing method.

Background Art

In production printing, a technology that prints cutting marks (i.e., trimming marks or crossmarks) on four corners of paper to guide a user in cutting for binding books is known. Furthermore, to match positions of images between the front surface and the back surface of paper, a technology is known, which adds marks for positioning on four corners of paper (hereinafter, marks used for cutting and positioning are referred to as "crossmarks") to K component or Y component of the image, scans crossmarks using a sensor after printing the image on the front surface, calculates a position of the image to be output on the back surface, and adjusts the position of the image using a correcting method.

However, in the known technologies, parameters for correction are determined using a chart previously prepared for positioning. Since correction is not performed for each paper by measuring crossmarks on each paper using a sensor every time printing is performed, there are variations in correction among paper. Furthermore, in the known technologies, a digital front end processor (DFE), which adds crossmarks, are not capable of printing crossmarks if K component does not exist. While it is still possible to consider adding crossmarks to Y component, monochrome sensors can easily read K color compared to Y color.

SUMMARY

Example embodiments of the present invention provide a novel image forming apparatus that includes an engine including circuitry that expands first image data, converts the expanded first image data into second image data in a format printable by the image forming apparatus, adds a positioning element to the second image data, the positioning element to be used for correcting positions of a first image and a second image, and controls a mechanical system of the image forming apparatus to print the second image data.

Further example embodiments of the present invention provide an information processing system, and a method of processing information.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

Figure 1:
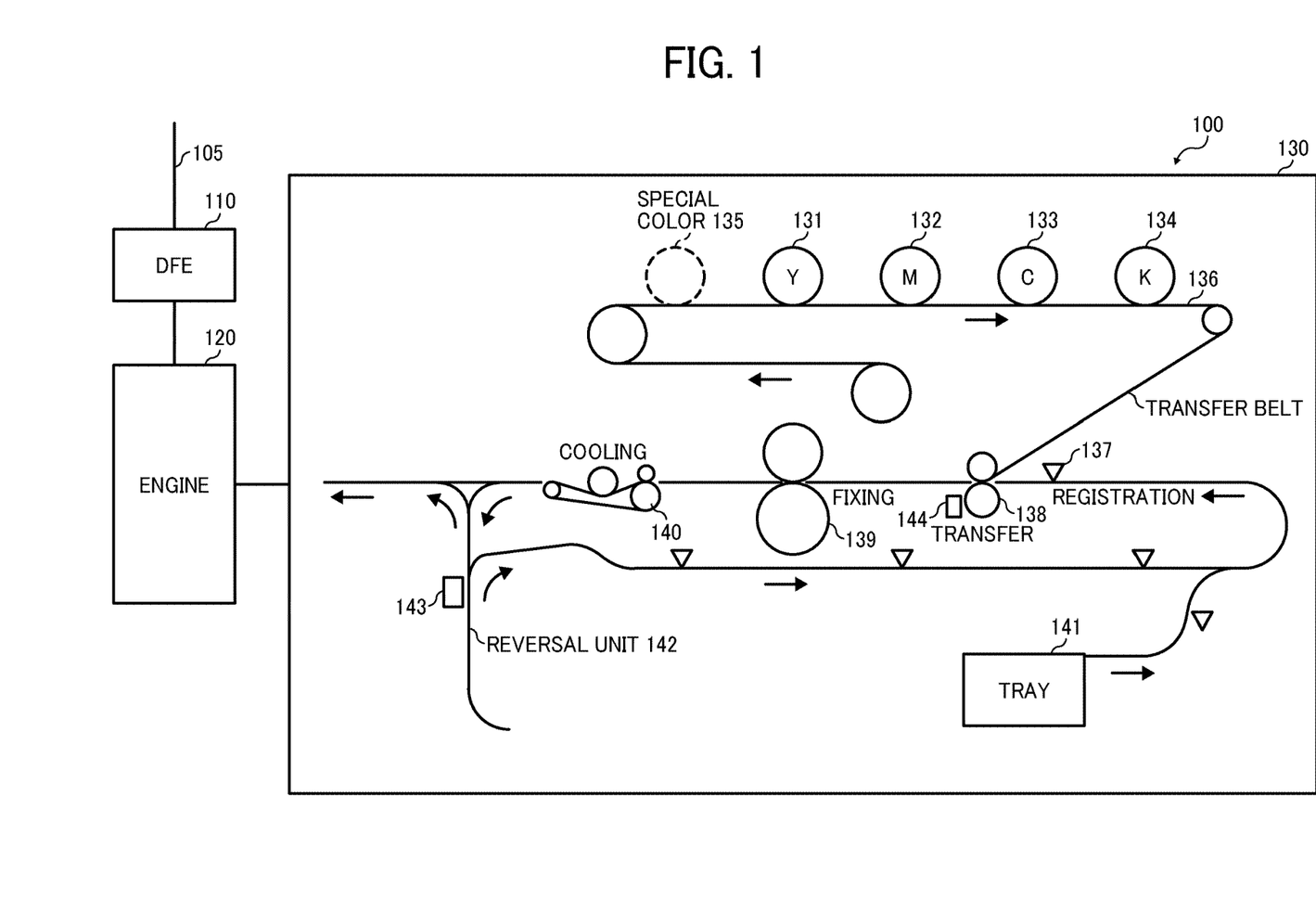
FIG. 1 is a schematic diagram of an information processing system as an embodiment of the present invention.

FIG. 1 is a schematic diagram of an information processing system 100 in this embodiment. In this embodiment, the information processing system 100 is constructed as a commercial printing system that prints out an image according to print job data issued by a host computer connected via a network 105. The network 105 can be constructed using networks such as a local area network (LAN), a wide-area network such as the Internet, and a virtual private network (VPN) etc. Examples of a connection protocol used for the network 105 are wired connections and wireless connections such as Ethernet, FTH, Wi-Fi, LTE, and IEEE 802.x etc.

The print job data generated by a host computer is transferred to a DFE 110 that performs image processing, as data indicating a format and condition settings to be referred to by an application used in the host computer. The DFE 110 applies the image processing to the print data from the host computer and transfers image data (first image data) to an engine 120 that controls an image forming apparatus 130 (described in detail later). In this embodiment, the engine 120 converts the image data into raster data in print colors other than standard four colors (i.e., C, M, Y, and K) such as gold color and silver color etc. (hereinafter referred to as special colors (S)) and transfers the raster data to the image forming apparatus 130.

In this embodiment, the image forming apparatus 130 uses electrophotography to form a toner image and fixes the toner image on printing paper. In performing printing, the printing paper is conveyed from a tray 141 and stops for a moment at a registration position 137 to adjust timing for printing. In accordance with the timing, the image forming apparatus 130, based on image data of Y color that is regarded as a top color to be formed first, forms a latent image on a photoconductor in a Y color photoconductor unit 131. Subsequently, the image forming apparatus 130 forms a latent image on a photoconductor in an M color photoconductor unit 132, forms a latent image on a photoconductor in a C color photoconductor unit 133, and form an image on a photoconductor in a K color photoconductor unit 134.

Each latent image is developed by using toner in each color into a toner image, and the toner image is transferred from the respective photoconductor units 131 to 134 to a transfer belt 136. In transferring images, timing is adjusted such that the toner images are transferred to the transfer belt 136 one above the other to form a composite image, which is referred to as a primary transfer. Subsequently, at a transfer unit 138, the composite image is transferred on the printing paper, which is referred to as a secondary transfer. After that, in a fixing unit 139, the printing paper is fixed by applying heat and pressure, and the printing paper is cooled down at a cooling unit 140.

If the print job instructs simplex printing, the printing paper is ejected from the image forming apparatus 130 after the image is formed as described above. By contrast, if the print job instructs duplex printing, the printing paper is conveyed to a reversal unit 142, switched back by going through the reversal unit 142, and conveyed again so that the second surface becomes the printing surface. In printing an image on the back surface (the second surface), the same operation as the operation performed on the first surface is performed. In this embodiment, a sensor that detects displacement in duplex printing is located at a position of a sensor 143 in FIG. 1.

Similarly, in printing an image on the second surface, the printing paper stops for a moment at the registration position 137. In the transfer unit 138, images in the respective colors are transferred secondarily, from the transfer belt 136 to the second surface. After fixing the image by applying heat and pressure, the printing paper is cooled down and ejected to the outside of the image forming apparatus 130.

In the image forming method described above, there are problems that the printing paper expands by applying heat and pressure in the fixing unit 139 and the image position on the second surface can be displaced from the image position on the first surface due to displacement in conveying the printing paper. Among the problems described above, the displacement due to conveying can be prevented by enhancing stiffness of a mechanical system for conveying.

By contrast, in order to prevent the displacement due to applying heat and pressure, the image forming apparatus 130 scans and detects crossmarks for positioning the image on the first surface that have already been printed. In this embodiment, the crossmarks correspond to a positioning unit. The detection result is transferred to the engine 120, and after performing trapezoidal correction etc. on the image data, the image data is transferred to the image forming apparatus 130 to perform printing and adjust positions of images on the front surface and the back surface.

Figure 2:
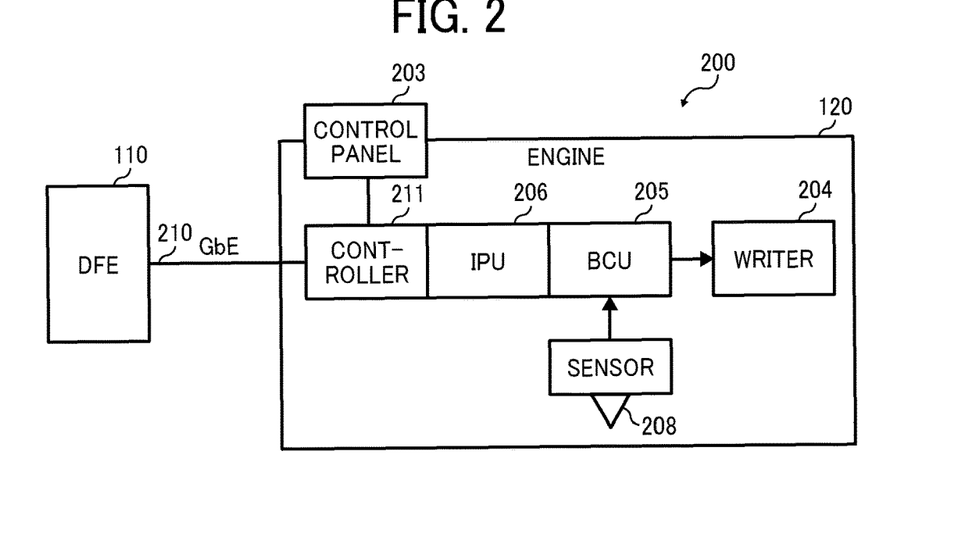
FIG. 2 is a diagram illustrating a functional block of an engine as an embodiment of the present invention.

FIG. 2 is a diagram illustrating a functional block of the engine 120 in this embodiment. The DFE 110 converts the print data transferred from a PC by a user into image data in an appropriate format. For example, the DFE 110 converts each of C, M, Y, and K (and special color S) components into image data in 1200 dpi and 8 bits. Subsequently, the DFE 110 performs image processing on the image data to reduce values (i.e., 2 bits per pixel) and compress the image data. Subsequently, the compressed image data is transferred to a controller 211 via a communication line 210 (using giga-bit Ethernet (GbE) in this case). In addition, a print command transferred along with the print data is transferred to the controller 211 in the engine 120. The DFE 110 in this embodiment corresponds to a unit that generates image data from the print job data transferred via the network 105.

The engine 120 includes the controller 211, an image processing unit (IPU) 206, a base control unit (BCU) 205, and a writer 204. After receiving the image data, print information, and command from the DFE 110, the controller 211 converts the command into a command that the BCU 205 can interpret and transfers the converted command to the BCU 205. In addition, the controller 211 decompresses the image data received from the DFE 110 to generate second image data in this embodiment and transfers the generated second image data to the IPU 206. In this embodiment, the controller 211 corresponds to a unit that decompresses the image data and converts the decompressed image data into the second image data that the image forming apparatus can print.

The IPU 206 is a unit for processing image in copying, and the IPU 206 provides a function that transfers image data if the image forming apparatus 130 functions as a printer. The BCU 205 controls mechanical systems in the engine 120 such as an exposure system, developing system, and paper-conveying system etc. In addition, the BCU 205 reads crossmark information scanned by the sensor 208 for detecting crossmark positions of the image forming apparatus and controls image forming timing etc. The writer 204 outputs each of C, M, Y, and K (S) components independently.

The engine 120 also includes a control panel 203, which provides a user interface (UI) function that allows a user to manually operate the image forming apparatus 130 by controlling the controller 211 via the control panel 203.

In this embodiment, after receiving the information detected by the sensor 208, the BCU 205 applies trapezoidal correction etc. to the received information and transfers the image data for the second surface to the writer 204 via the IPU 206 and the BCU 205 to command the writer 204 to print the image on the second surface. In this embodiment, the BCU 205 corresponds to a unit that controls the mechanical system to output the second image data.

In this embodiment, the controller 211 provides a function that adds crossmark images for printing the second surface. In performing duplex printing on the print job data in this embodiment, the controller 211 corresponds to a unit that adds the positioning unit for positioning images on the first surface and the second surface in duplex printing. That is, in this embodiment, not the DFE 110 but the engine 120 performs the operation of adding crossmarks for positioning to reduce load on the DFE 110. As a result, it is possible to process the operation at high speed and perform duplex printing favorably.

Figure 3:
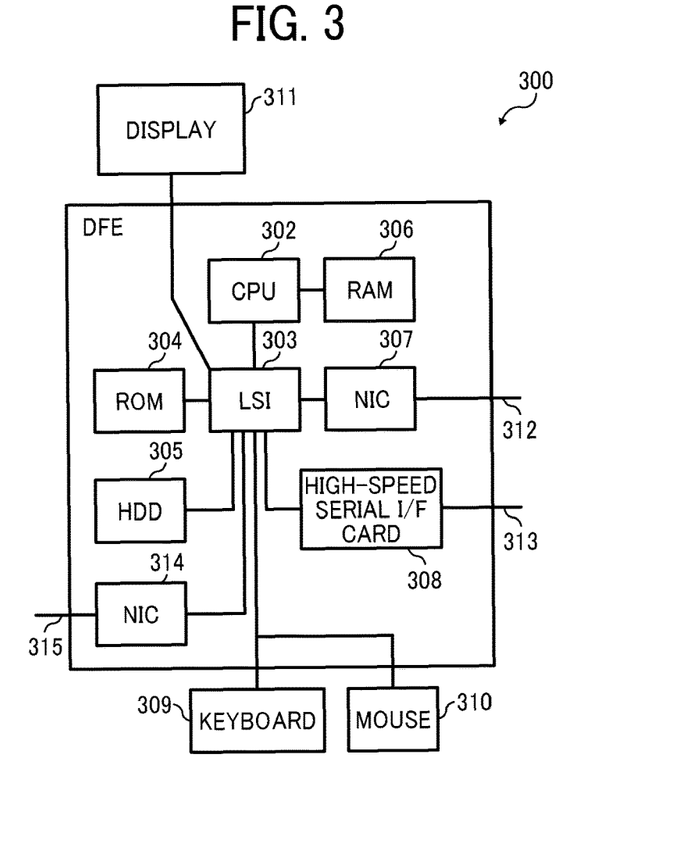
FIG. 3 is a diagram illustrating a hardware configuration of a DFE as an embodiment of the present invention.

FIG. 3 is a diagram illustrating a hardware configuration 300 of the DFE 110 in this embodiment. The DFE 110 includes an information processing apparatus such as a personal computer (PC) and a workstation etc., and peripherals such as a display 311, a keyboard 309, and a mouse 310 that are connected to the DFE 110 via a LSI 303 such as PCIe bus etc. to implement various functions.

The DFE 110 includes a CPU 302, a RAM 306, and a ROM 304. The CPU 302 executes an appropriate operating system (OS) to control the entire DFE 110. The RAM 306 provides a memory that the CPU 302 uses to execute a program. The ROM 304 stores an initializing program. After turning on the DFE 110, firstly, the DFE 110 reads BIOS from the ROM 304, initializes configuration, and initializes the entire information processing system.

Furthermore, the DFE 110 may include a HDD 305, NICs 307 and 314, and a high-speed serial interface (I/F) card 308. The HDD 305 stores an application, data, and received data etc. The NIC 307 is a network interface card that provides a dedicated interface for communicating with the controller 211 in the engine 120 via the GbE 312 that performs communication at a rate of 1 G bit/sec level. The NIC 314 provides a function that communicates with the host computer at a rate of 1 G bit/sec level.

The high-speed serial I/F card 308 operates when the image transfer unit is implemented in the engine 120. The high-speed serial I/F card 308 provides a function that connects to the image transfer unit and is controlled by a program in the DFE 110. If the image transfer unit is not used, it is possible to omit the high-speed serial I/F card 308. The image transfer unit is described in detail later.

Figure 4:
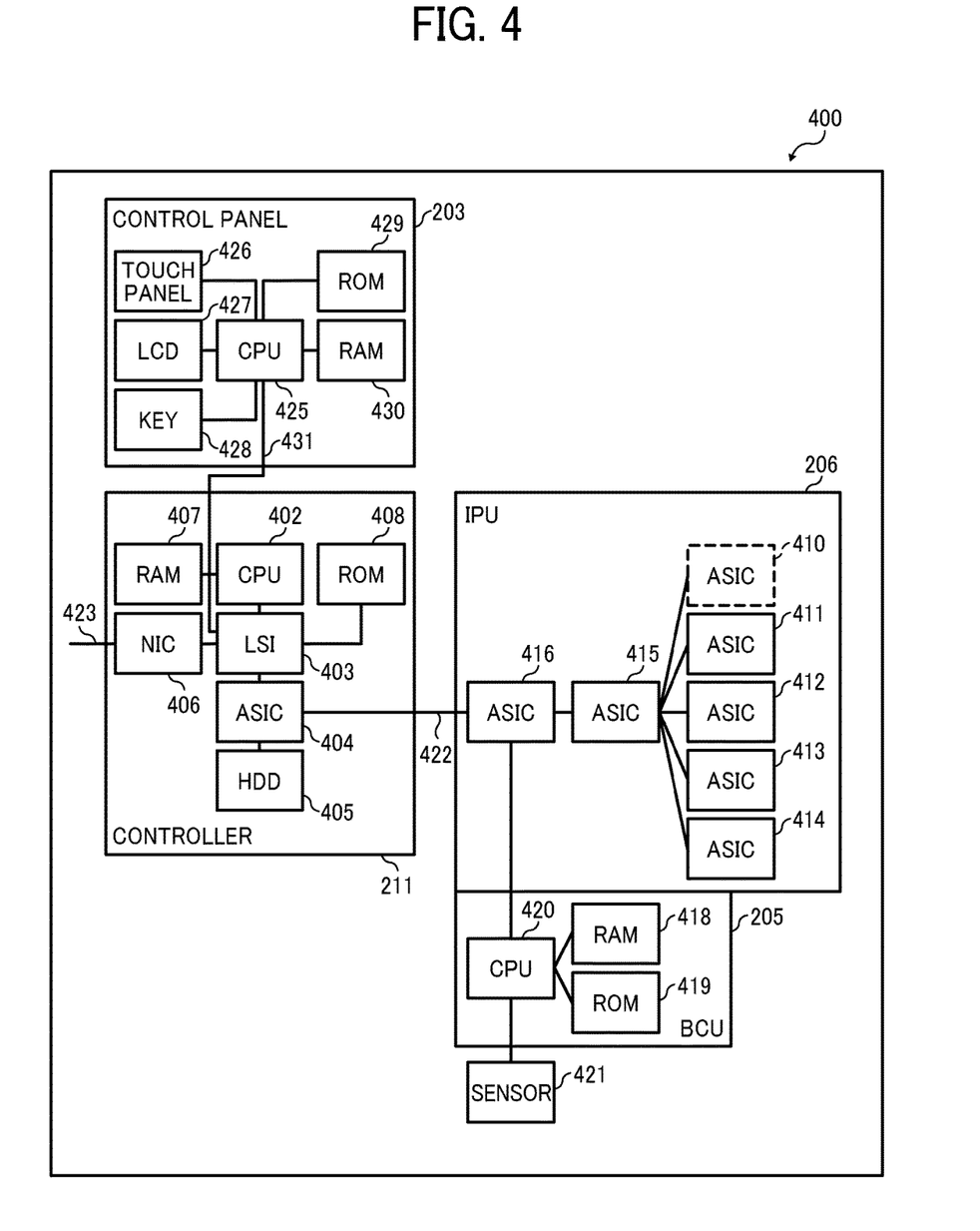
FIG. 4 is a diagram illustrating a hardware configuration of the engine as an embodiment of the present invention.

FIG. 4 is a diagram illustrating a hardware configuration of the engine 120 in this embodiment. The engine 120 includes the control panel 203, the controller 211, the IPU 206, and the BCU 205. The control panel 203 provides a function that commands the controller 211 to perform various operations by user operation and configures the controller 211, and the control panel 203 includes a CPU 425, a ROM 429, and a RAM 430. The CPU 425 controls the entire control panel 203, initializes the control panel 203 using a program stored in the ROM 429, executes an OS by using the RAM 430 as a work area, and provides functions of the control panel 203.

The control panel 203 further includes a touch panel 426, a liquid crystal display (LCD) 427, a dedicated hardware key 428, and a control panel I/F 431. The touch panel 426 detects input by user operation and to command the CPU 425 to perform an intended operation. The LCD 427 provides user interfaces such as an operating menu of the controller 211 and launching an application etc. The dedicated hardware key is used for allowing user input using a 10-key keypad etc. and configuring settings that cannot be configured by using the touch panel 426. The control panel I/F 431 can be a peripheral bus line such as PCIe etc. for communication between the control panel 203 and the controller 211.

The controller 211 includes a CPU 402, a ROM 408, a RAM 407, and a LSI 403. The CPU 402 reads an initializing program from the ROM 408 and executes the program. By executing the initializing program, a device included in the controller 211 is initialized so that an ASIC 416 in the IPU 206 may communicate with an ASIC 404. The RAM 407 functions as a video RAM to store image data in the RAM 407 and transfer the image data to the IPU 206 via the PCIe bus 422 using a DMA function provided by the ASIC 404.

The CPU 402 stores the compressed image data in the RAM 407 and transfers the image data to the IPU 206 via the PCIe bus 422 decompressing the image data using the DMA function including a decompressing function provided by the ASIC 404. A program, data, and setting values required for control are stored in a HDD 405 and used for providing functions of the controller 211 by being loaded into the RAM 407 in response to a request from the CPU 402. A NIC 406 is a network interface card that receives image data transferred by the DFE 110 via a network 423 and transfers the received image data to the LSI 403 via the PCIe bus. The NIC 406 also provides a dedicated interface function to communicate with the DFE 110.

The IPU 206 included in the engine 120 transfers an image for each color component in this embodiment. The IPU 206 includes ASICs 410 to 416 and is communicably connected to the controller 211 via the PCIe bus 422. Functions of each ASIC are described below.

The ASIC 410 provides a function of writing special colors. The ASIC 410 is called when the fifth color (special color) is used optionally. The ASIC 410 also provides a function of correcting an image (trapezoidal correction). Correction parameters are configured by the BCU 205. The ASIC 411 provides a function of writing Y color. The ASIC 411 also provides a function of correcting an image (trapezoidal correction). Correction parameters are configured by the BCU 205. The ASIC 412 provides a function of writing M color. The ASIC 412 also provides a function of correcting an image (trapezoidal correction). Correction parameters are configured by the BCU 205. The ASIC 413 provides a function of writing C color. The ASIC 413 also provides a function of correcting an image (trapezoidal correction). Correction parameters are configured by the BCU 205. The ASIC 414 provides a function of writing K color. The ASIC 414 also provides a function of correcting an image (trapezoidal correction). Correction parameters are configured by the BCU 205. The ASIC 415 controls each of the ASICs 410 to 414 used for writing control. The ASIC 416 processes an image. In this embodiment, if the image forming apparatus 130 functions as a printer, the image processing is not applied substantially, the ASIC 416 functions as a buffer for the image data, and the BCU 205 controls the ASIC 416.

In this embodiment, the correction process is not limited to trapezoidal correction, and any correction process may be applied as long as the correction corrects deformation of the image on paper due to heat and pressure.

The BCU 205 in the engine 120 controls mechanical elements such as paper conveyance etc. and timing of transferring an image etc., and the BCU 205 includes a CPU 420, a RAM 418, and a ROM 419. The RAM 418 is a memory used by the CPU 420, and the ROM 419 stores a program and data used by the CPU 420. By executing a configuration program such as BIOS etc., each of the IPU 206 and the BCU 205 is initialized. The BCU 205 enables mechanical control and correction control by acquiring information from a sensor 421 that detects crossmarks for positioning. The BCU 205 reads the image data and determines coordinates of crossmarks.

In this embodiment, by using the engine 120 as described above, the apparatus is controlled so that there is no displacement between images on both sides. Preferably, the embodiment illustrated in FIG. 4 may be implemented in case speed of image processing is relatively slow and engine 120 may keep up with printing speed even in case of correcting image data in addition to image processing.

Figure 5:
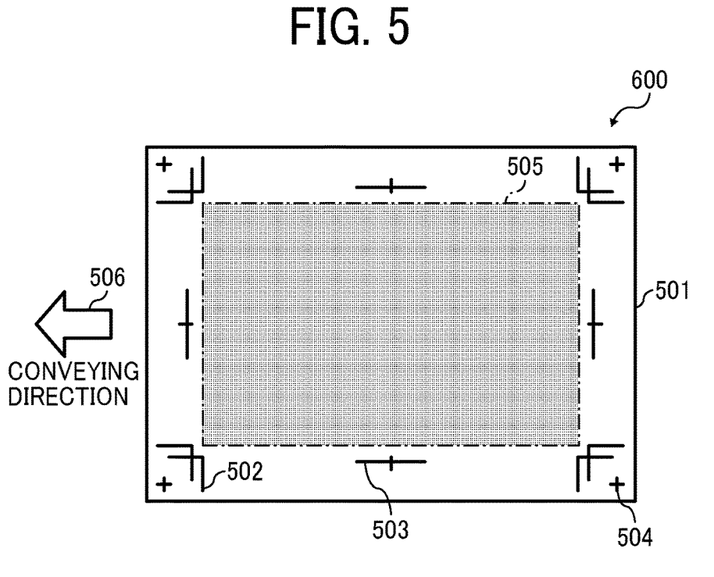
FIG. 5 is a diagram illustrating an image of crossmarks as an embodiment of the present invention.

FIG. 5 is a diagram illustrating an image of crossmarks in this embodiment. In this case, it is assumed that paper 501 is conveyed in the direction of a conveying direction 506 and an image has already been printed on the first side. Crossmarks 502 and 503 are used for positioning in cutting the paper. Crossmarks 504 are used for positioning and printed each at a position closer to the paper edge compared to the crossmarks 502 and 503 for cutting as illustrated in FIG. 5. Four crossmarks 504 in total are printed at each corner of the paper. An area 505 is a printable area, and crossmarks are not to be printed inside the area 505.

After printing crossmarks 504 for positioning at four corners outside the crossmarks 502 and 503 for cutting, crossmarks on the first side are scanned using the sensor 208. After detecting displacement of coordinates of the crossmarks on the first side, trapezoidal correction is performed by the writing unit 204 in FIG. 2. Mechanically, the sensor 208 is located at a position indicated as the sensor 143 at the entrance of the reversal unit 142.

Figure 6:
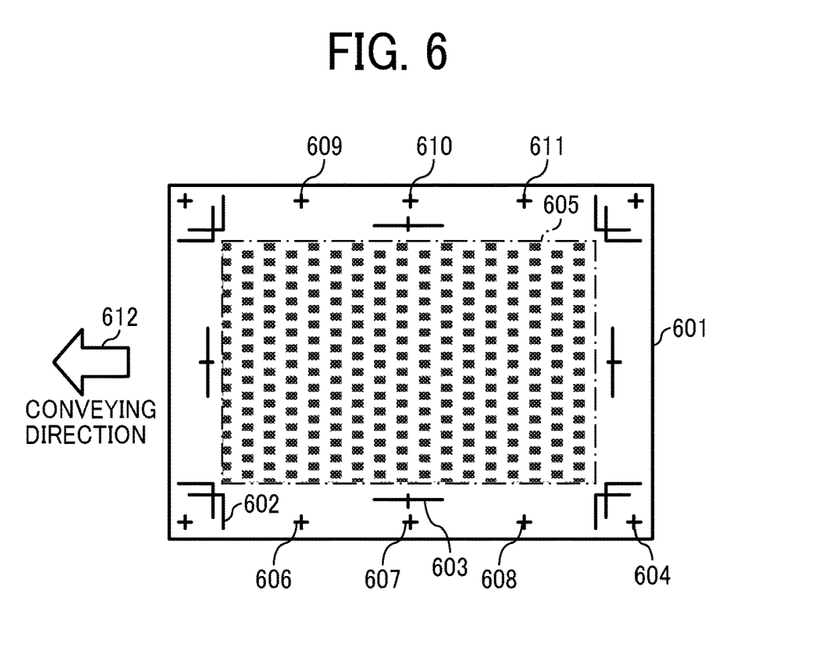
FIG. 6 is a diagram illustrating an image of crossmarks as an embodiment of the present invention.

FIG. 6 is a diagram illustrating an image of crossmarks in another embodiment. In this case, it is assumed that paper 601 is conveyed in the direction of a conveying direction 612 and an image has already been printed on the first side. Crossmarks 602 and 603 are used for positioning in cutting the paper. Crossmarks 604 are used for positioning and printed outside the crossmarks 602 and 603 for cutting as illustrated in FIG. 5. Four crossmarks 604 in total are printed at each corner of the paper. An area 605 is a printable area, and crossmarks are not to be printed inside the area 605. In addition, in this embodiment illustrated in FIG. 6, crossmarks 606 to 611 are printed. The crossmarks 606 to 611 are printed to divide a line virtually formed between the crossmarks 604 located at four corners at even intervals in the conveying direction, and may be used to correct an adjacent rectangular area surrounded by the crossmarks 602 and 603 for positioning.

In this embodiment, the engine 120 prints the crossmarks illustrated in any one of FIGS. 5 and 6. Accordingly, by distributing processing load of the DFE 110 to the engine 120, it is possible to keep up with high-speed processing and enhance quality of duplex printing.

Figure 7:
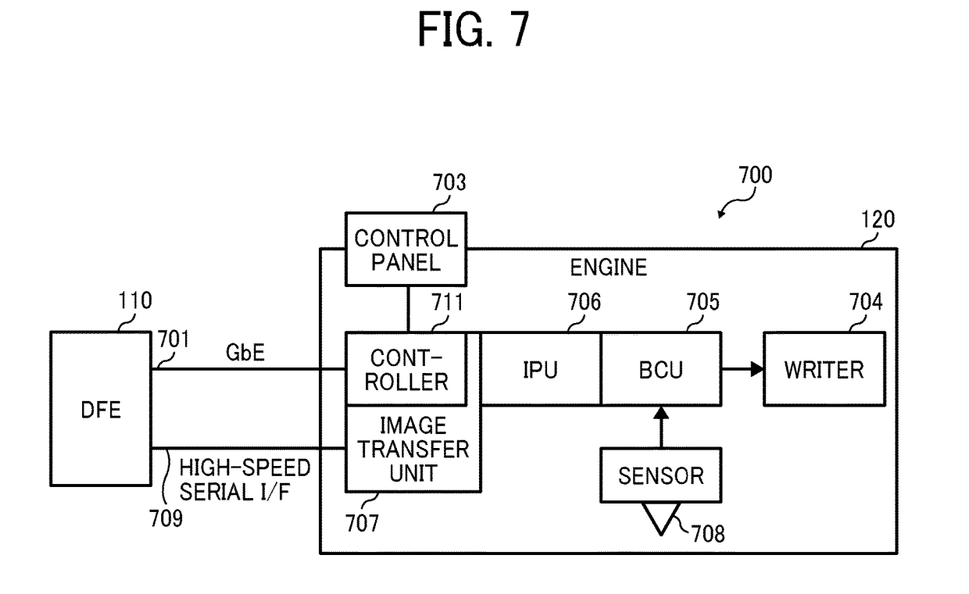
FIG. 7 is a diagram illustrating a functional block of an engine as an embodiment of the present invention.

FIG. 7 is a diagram illustrating functional blocks in the engine 120 according to a second embodiment. The engine 120 in this embodiment may be implemented for high-speed printing preferably. The DFE 110 also includes a communication interface such as a wired LAN or a wireless LAN etc. to receive print information from an information processing apparatus such as a host computer etc.

In this embodiment illustrated in FIG. 7, the engine 120 also includes an image transfer unit 707. The image transfer unit 707 receives image data separately from the print settings and print command from the DFE 110 via a high-speed serial I/F and performs image processing on the received image data. In this embodiment, the image transfer unit 707 corresponds to a unit that receives the image data, decompresses the received image data, performs image processing on the image data, and adds the unit for positioning described before.

In comparing the first embodiment with the second embodiment, in the first embodiment, the DFE 110 performs the screening operation on the multi-valued image for each page drawn by the DFE 110, reduces values of the multi-valued image, compresses the image, and transfers the compressed image to the controller 711 via the GbE 701. Subsequently, the controller 211 decompresses the compressed image to generate the second image data and transfers the second image data to the IPU 706.

By contrast, in the second embodiment, the processing speed of the engine 120 is increased, and the speed of transferring an image from the DFE 110 to the controller 711 and transfer via the GbE 701 becomes ineffective. Therefore, the image transfer unit 707 is added to improve data transfer efficiency and achieve further high-speed processing. The image transfer unit 707 mainly receives and processes image data generated by the DFE 110 via a transfer path of the image data newly implemented. As a result, the processing load of the DFE 110 is distributed to the engine 120, and it is possible to transfer and process image at high-speed.

By adopting the modification of configuration along with the second embodiment, it is possible to relocate image processing such as screening, decompressing, edge-enhancing, and γ correction etc. to the engine 120 more efficiently. Regarding image correction, it is possible to perform feedback in real time and stabilize image quality. An operation performed by the engine 120 in FIG. 7 is described below.

First, print job data transferred by the host computer is stored in an appropriate storage device such as the HDD in the DFE 110. After the DFE 110 interprets and draws the print job data, the image data and print information and print command are divided for each page. In this embodiment, it is assumed that the DFE 110 delegates operations such as reducing values of the generated image data and screening the image data etc. to the engine 120. However, in the second embodiment, the DFE 110 may compress the image data and transfers the compressed image data to the engine 120 just like the case in the first embodiment.

The print information and print command are transferred to the controller 711 via the GbE 701, and the print information is transferred to the image transfer unit. In accordance with the print information, the image transfer unit 707 receives image data from the DFE 110 in units of page via the high-speed serial interface 709. For example, if all color components are available, the image data is uncompressed data in 1200 dpi and 8 bits for each of colors (C, M, Y, and K). In addition, tag information in 2 bits is included as object information for each pixel. Color components that are not printed are not transferred.

After receiving the image data for each color component, the image transfer unit 707 compresses the image data using screening and reducing values, performs image processing in accordance with the print information, and stores image data for each component in the memory in the image transfer unit 707. The stored image data is uncompressed data in 1200 dpi and 8 bits for each of colors (C, M, Y, and K). The CPU 834 compresses the image data and commands the FPGA 837 to perform various image processing operations.

After all image data is available for the page to be printed, the image transfer unit 707 notifies the controller 711, and the controller 711 issues a command to print to the IPU 706. The BCU 705 interprets the command transferred to the IPU 706 and commands the IPU 706 to transfer an image. In addition, the BCU 705 feeds the paper used for printing from the paper feeding tray and starts transferring image in accordance with predetermined timing. The writing unit 704 forms an image on the photoconductor using image data for each color to go ahead with the printing operation.

Figure 8:
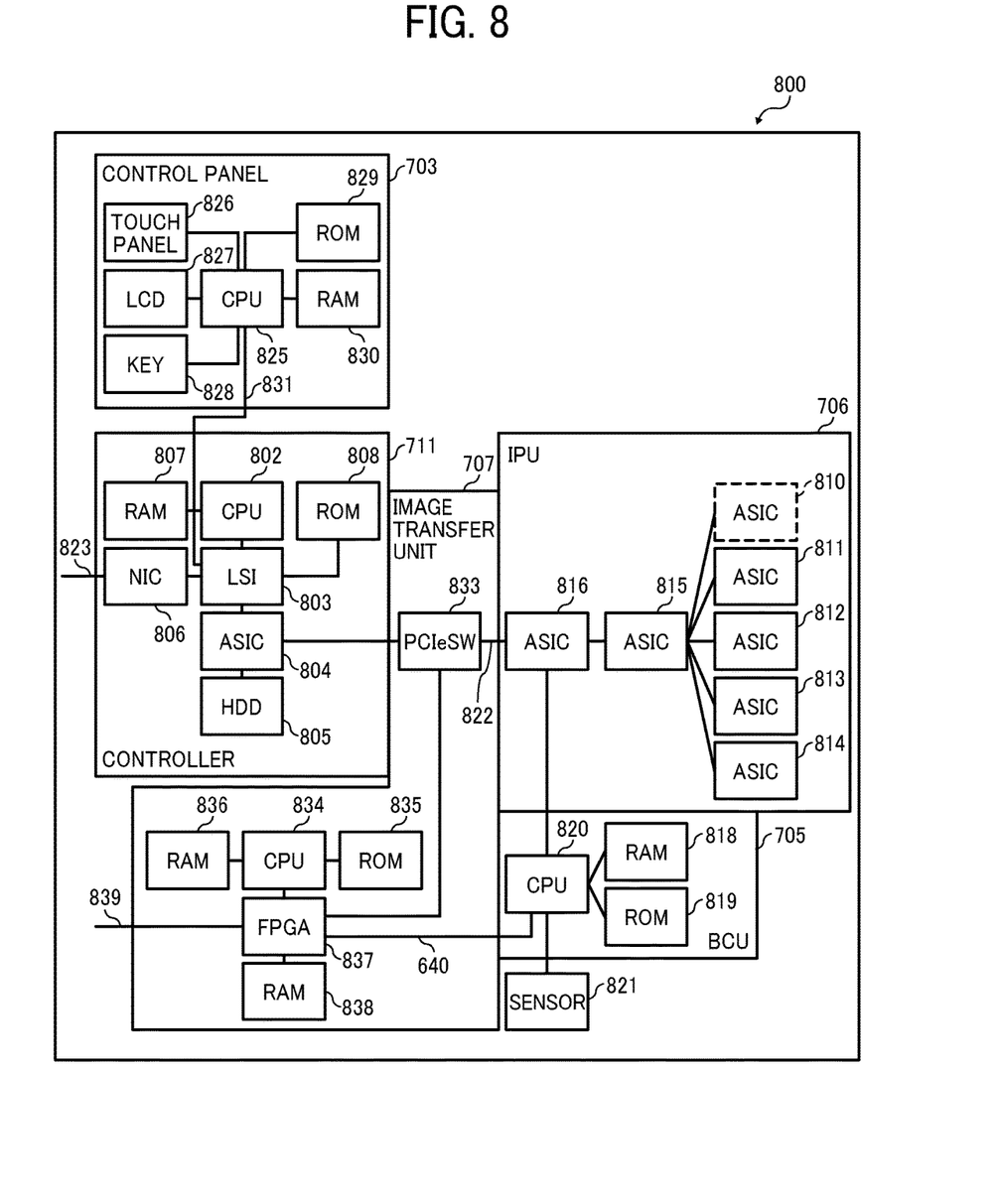
FIG. 8 is a diagram illustrating a detailed hardware configuration of the engine as an embodiment of the present invention.

FIG. 8 is a diagram illustrating a detailed hardware configuration 800 of the engine 120 in this embodiment. Other than relationship with the image transfer unit 707, detailed descriptions of the control panel 703, the controller 711, the IPU 706, and the BCU 705 in common with the first embodiment are omitted.

The image transfer unit 707 is mutually connected to the controller 711 and the IPU 706 via the PCIe switch 833. The image transfer unit 707 receives image data before performing image processing from the DFE 110 via the high-speed serial interface 839. The PCIe switch 833 is a PCIe switching device that switches multiple PCIe devices and initialized by the controller 701. The image transfer 707 further includes a CPU 834, a RAM 836, a ROM 835, a FPGA 837, and a RAM 838 mainly used by the FPGA 837.

The CPU 834 reads a program stored in the ROM 835 to perform initialization and control the entire image transfer unit 707. The ROM 835 stores BIOS and other programs executed by the CPU 834. The RAM 836 provides a work area that the CPU 834 executes the program and also functions as an image RAM in performing image processing operations.

The FPGA 837 reads configuration data stored in the RAM 838 and configures a programmable gate array in accordance with Hardware Description Language (HDL) etc. to implement operations described in this embodiment. The FPGA 837 receives image data from the DFE 110 via the high-speed serial interface 839 and performs image processing operations on the received image data.

In this case, examples of the image processing operations are dithering operation, edge-enhancing operation, γ correction, and crossmark adding operation etc. Furthermore, the FPGA 837 generates less-valued image data and stores the generated image data in the RAM 836. Subsequently, in response to a request to transfer from the IPU 706, the FPGA 837 transfers the less-valued image data from the RAM 836 to the IPU 706 for each color component.

The IPU 706 and the BCU 705 each processes the image data transferred by the image transfer unit 707 just like the case in the first embodiment, and the processed image data is transferred to the writing unit 704 to form an image.

Figure 9:
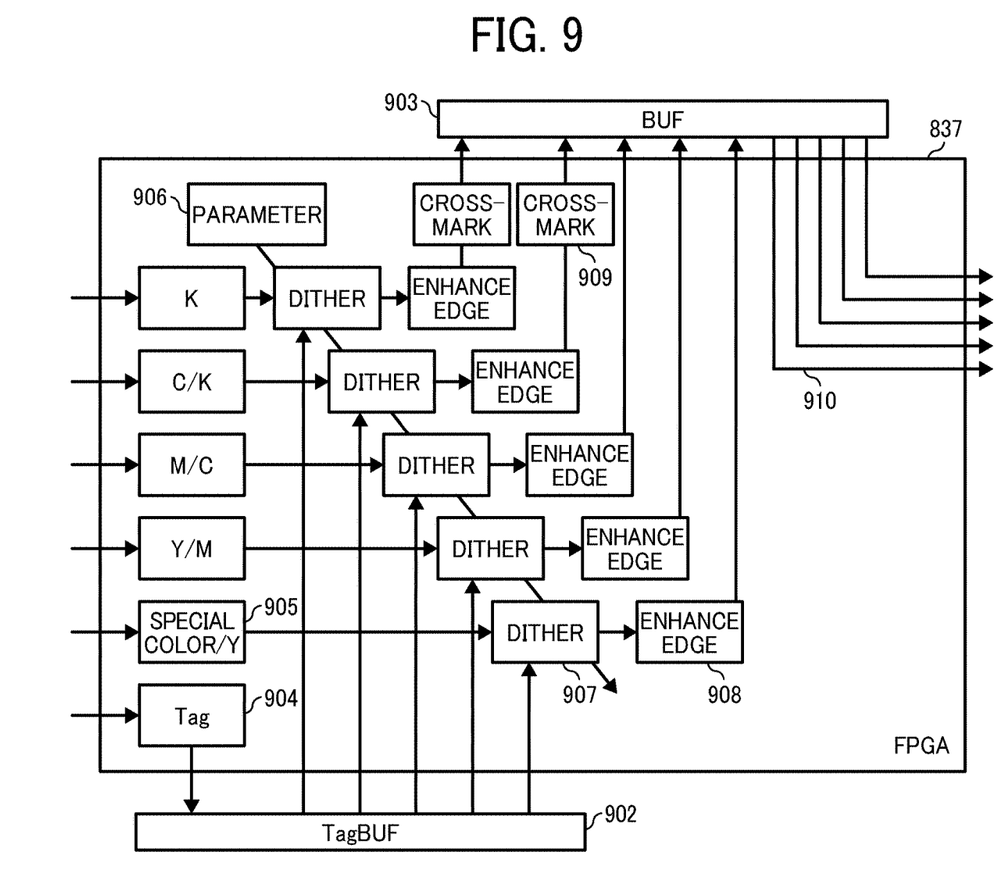
FIG. 9 is a diagram illustrating a detailed functional block of a field programmable gate array (FPGA) included in an image transfer unit as an embodiment of the present invention.

FIG. 9 is a diagram illustrating detailed functional blocks of the FPGA 837 included in the image transfer unit 707 in this embodiment. The FPGA 837 includes a tag buffer 902, a page buffer 903, and a tag data receiving circuit 904. The tag buffer 902 is a buffer that stores tag data. In this embodiment, tag data in 2 bits is generated for each pixel, and the tag data remains as control information until image processing operation is finished for all components of the page. The page buffer 903 is a memory that stores image data for each color component after performing image processing operation.

The image data is segmented for each color component and read by the IPU 706. After finishing reading all color components, image processing operation is started to perform on the same color component for another page. The page buffer 903 includes buffers of two pages for front side and two pages for back side. The tag data receiving circuit 904 receives the tag data. Just after receiving the tag data, the tag data is used for performing image processing operation on the top color (special color or Y color). In addition, the tag data is temporarily stored in the tag buffer 902 to synchronize timing for transferring other color components. The tag data is discarded after finishing image processing operation on all color components of the page.

The FPGA 837 includes a color component receiving circuit 905, a parameter receiving circuit 906, and a dithering processor 907. The color component receiving circuit 905 receives image data for each of color components (special color component, Y component, M component, C component, and K component). In this embodiment, if the special color does not exist, the fifth station of the receiving circuit that processes the optional special color is not required. Therefore, the operation is performed after shifting processing color. This is because the tag data is transferred in synchronization with the image data of the top color by the transfer interface and the top color is performed image processing operation just after the reception. Therefore, in implementing the circuit, it is required to change the processed color for each stage depending on whether or not the special color exists.

The parameter receiving circuit 906 receives a parameter for performing image processing configured for each page. The parameter is transferred from the DFE 110 to the controller 711. The controller 711 transfers the parameter to the FPGA 837 for processing, and the parameter is stored in the parameter receiving circuit 906. The dithering processor 907 performs dithering operation for each color component independently. It should be noted that a parameter for dithering operation varies for each color component.

Furthermore, the FPGA 837 includes an edge-enhancing circuit 908, a crossmark adding circuit 909, and an image output circuit 910. The edge-enhancing circuit 908 is allocated for each color component and performs edge-enhancing operation on image data for each color component. It should be noted that the edge-enhancing operation is performed if an object to be printed is text.

The crossmark adding circuit 909 is located at an output of the edge-enhancing circuit 908 in a stage that K component image data is to be processed. It is preferable to form crossmarks on K component image data in view of detectability etc. In this embodiment, two modules of the crossmark adding circuit 909 are implemented depending on whether or not the special color exists. If the crossmark adding function is available, the crossmark adding circuit 909 determines positions of the crossmark image considering paper size included in the page information and adds crossmarks at determined positions.

In this embodiment, even if K component image data does not exist in the image data, by using a dummy image, K component image data with crossmarks is generated from the dummy image to add crossmarks. Furthermore, the image output circuit 910 reads image data for each color component in response to a request to read image data for each color component transferred by the page buffer 903 and transfers image data for each color component to the BCU 705 to proceed subsequent operations. In this embodiment, the FPGA 837 that mainly performs image processing is implemented separately. As a result, it is possible to distribute processing load in the engine 120 to accommodate drawing operations at higher speed.

Alternatively, the FPGA 837 may be implemented as a module in the controller 211 or the IPU 206 of the engine 120 in the first embodiment. This improves efficiency in distributing processing load, such that the information processing system 100 can process printed matter with higher quality at higher speed.

Figure 10:
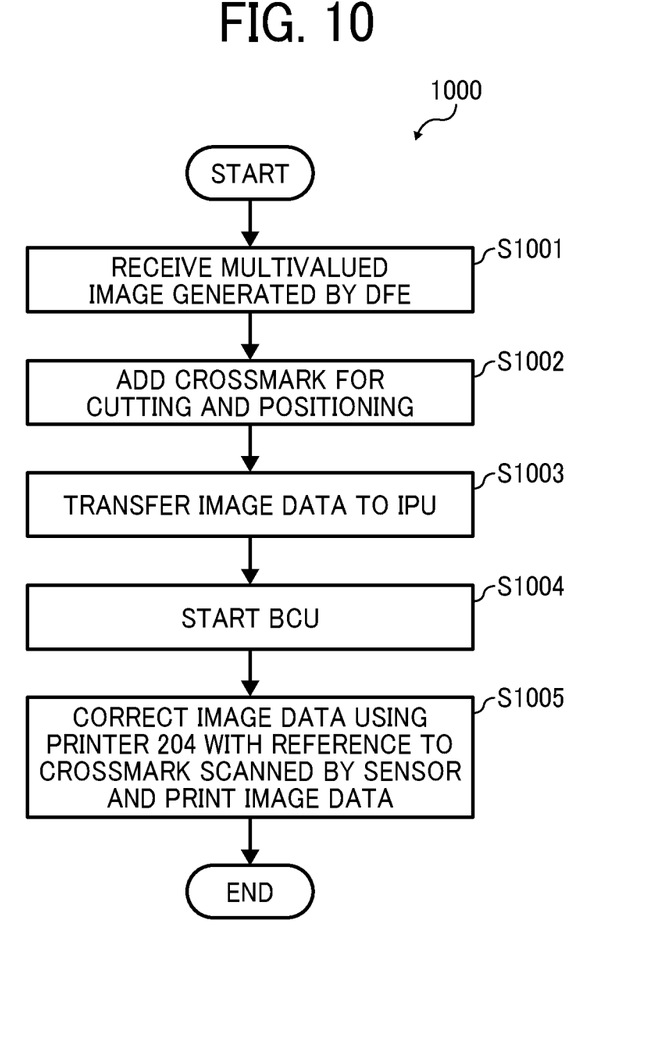
FIG. 10 is a flowchart illustrating operation of adding crossmarks performed by a controller implemented by the engine as an embodiment of the present invention.

FIG. 10 is a flowchart of an operation of adding crossmarks performed by the controller 211 implemented by the engine 120 in the first embodiment. The operation starts with starting of processing the second surface. In S1001, the multi-valued image generated by the DFE 110 is received. After performing decompressing operation in S1002, crossmarks for cutting and positions are added to K component image data, while referring to a paper size.

In S1003, the image data is transferred to the IPU 206, and the BCU 205 is executed in S1004. In S1005, by controlling the writing unit 204, for example, trapezoidal correction is performed on the image data using information on crossmark positions on the first surface, and the image data is printed. After finishing all processing on the entire page, the operation ends. As described above, in this embodiment, the engine 120 may output crossmarks independently from the DFE 110. Therefore, it is possible to distribute processing load of the DFE 110, thus, enhancing a speed of print processing.

Figure 11:
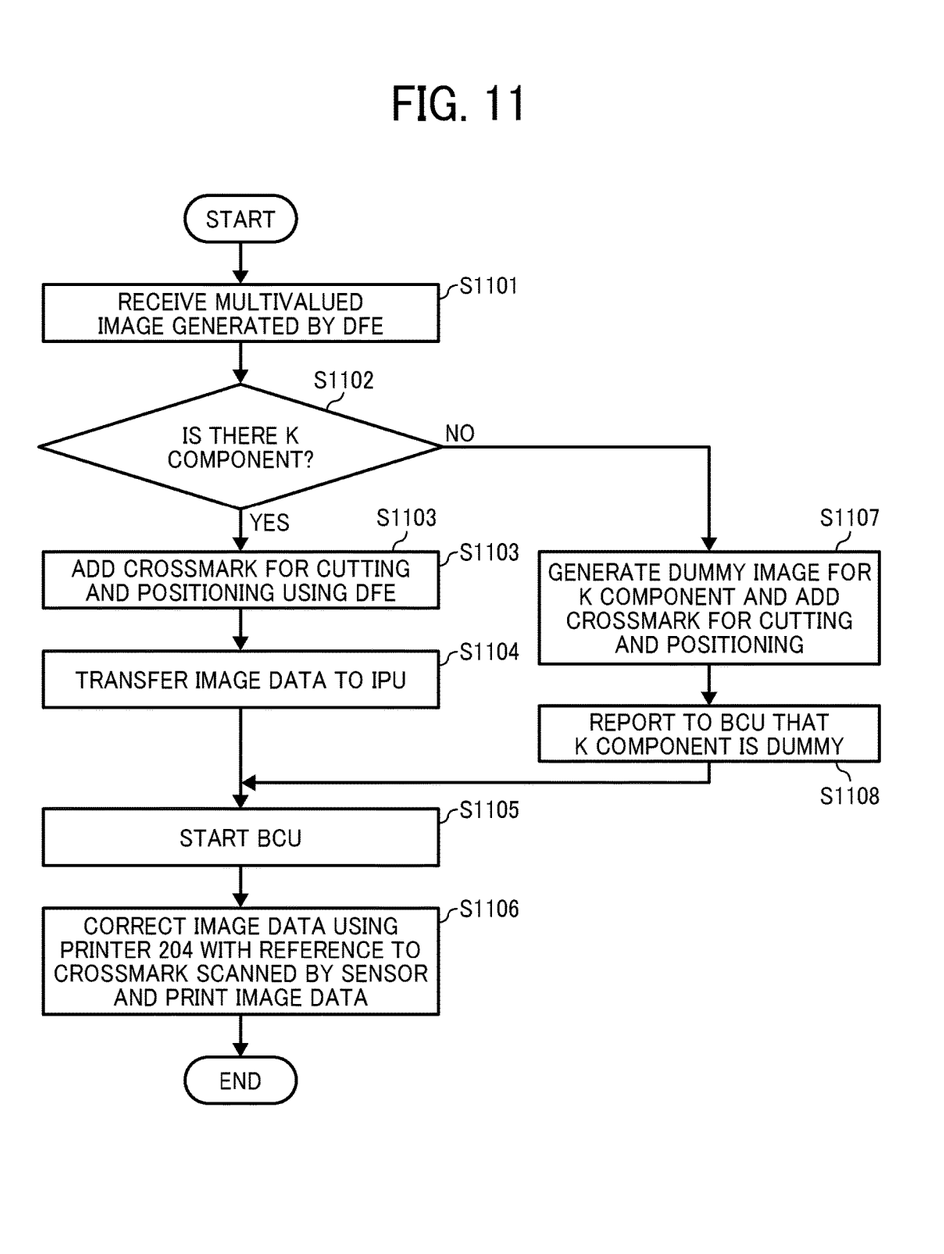
FIG. 11 is a flowchart illustrating operation of adding crossmarks performed by the engine as an embodiment of the present invention.

FIG. 11 is a flowchart of an operation of adding crossmarks, performed by the engine 120 in the first embodiment, according to a modified example. It should be noted that the controller 211 in this embodiment determines whether or not the image data includes K component image data. In an example illustrated in FIG. 11, the operation is modified depending on whether or not the image data includes K component image data for adding crossmarks. After starting the operation in FIG. 11, in S1101, the multi-valued image generated by the DFE 110 is received. In S1102, it is determined whether or not the image data includes K component image data. If K component image data exists (YES in S1102), in S1103, the image data is decompressed, and crossmarks for cutting and positioning are added to, preferably, K component image data with reference to a paper size.

In S1104, the image data is transferred to the IPU 206, and the BCU 205 is executed in S1105. In S1106, by controlling the writing unit 204, for example, trapezoidal correction is performed on the image data using information on crossmark positions on the first surface, and the image data is printed. After finishing all processing on the entire page, the operation ends.

By contrast, if K component image data does not exist (NO in S1102), the operation proceeds to S1107. At S1107, the K component dummy image is generated by the controller 211, and crossmarks for cutting and positioning are added to the dummy image. In S1108, the controller 211 notifies the BCU 205 of information indicating that K component is dummy using a flag or an appropriate identification value. The operation proceeds to S1105 and S1106 to print the image data. After finishing all processing on the entire page, the operation ends.

As described above, in this embodiment, the engine 120 may output crossmarks independently from the DFE 110. In addition, crossmarks are added automatically even if K component image data does not exist. Accordingly, crossmarks are added for sure, while distributing processing load of the DFE 110, thus, enhancing speed of print processing. In FIGS. 10 and 11, it is assumed that the controller performs the operation. However, the IPU 206 may perform the operation related to image processing.

Figure 12:
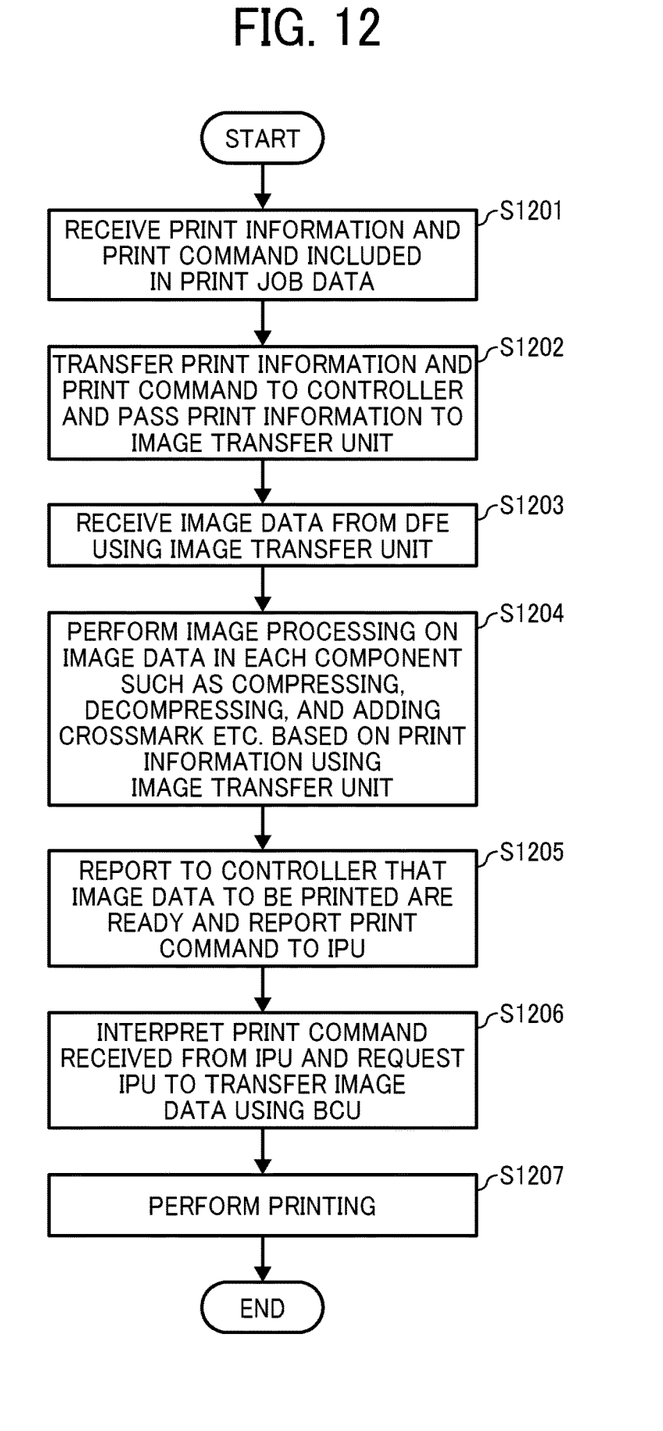
FIG. 12 is a flowchart illustrating operation of adding crossmarks performed by the engine as an embodiment of the present invention.

FIG. 12 is a flowchart illustrating operation performed by the engine 120 in the second embodiment, according to another embodiment. The operation illustrated in FIG. 12 corresponds to an embodiment that uses the image transfer unit 707 in FIG. 7. In FIG. 12, after starting the operation, in S1201, print information and print command among print job data are received from the DFE 110. In S1202, the print information and print command are transferred to the controller 711 to pass the print information to the image transfer unit. In S1203, the image transfer unit 707 receives image data from the DFE 110. In S1204, the image transfer unit 707 performs image processing operations including crossmark adding operation on image data for each color component.

In S1205, after compressing operation, decompressing operation, and crossmark adding operation are finished and image data to be printed become available, the controller 711 is reported that the image data is available, and a command to print is passed to the IPU 706. Subsequently, in S1206, the BCU 705 interprets the command to print received from the IPU 706, and the IPU 706 is requested to transfer the image data. In S1207, the image data is passed to the writing unit 704. After performing image correction using position information on detected crossmarks, printing is performed.

In the embodiment illustrated in FIG. 12, in another example, the operation may further performs step S1102 in FIG. 11, to add crossmarks to image data without K component image data. In addition, in another embodiment, by preparing an image including crossmarks as K component always, it is possible to integrate the image as K component of the image data in outputting the image data.

In this embodiment, it is possible to add crossmarks used in printing the first side at the engine 120. That is, the embodiment is not limited to the case that adds crossmarks in printing the second side.

As described above, in one or more embodiments described above, a processing load of the information processing system 100 is distributed, while preventing images from being displaced in duplex printing, such that the information processing system 100 can achieve high-quality printing at high-speed.

The embodiments described above provide the information processing apparatus that may add crossmarks using the engine efficiently.

The present invention also encompasses a non-transitory recording medium storing a program that executes an information processing method, performed by an information processing system that includes an image forming apparatus. The information processing method, performed by the information processing system, includes the steps of expanding first image data, converting the expanded first image data into second image data in a format printable by the image forming apparatus, adding a positioning element to the second image data, the positioning element to be used for correcting positions of a first image and a second image, and controlling a mechanical system of the image forming apparatus to print the second image data.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system, comprising:
a digital front end to generate first image data for printing from print job data transferred via a network, the print job data instructing to perform duplex printing to respectively print a first image and a second image on a first side and a second side of a sheet;
an engine including a writer to print the first image and the second image on the first side and the second side of the sheet, and circuitry to:
receive the first image data from the digital front end;
determine whether the first image data includes K component image data;
in response to determining that the first image data includes K component image data, decompress the first image data and add a positioning element to the K component image data;
in response to determining that the first image data does not include K component image data, generate K component dummy image data and add the positioning element to the K component dummy image data;
receive position data from a sensor configured to detect the positioning element on the first side of the sheet;
determine a corrected position of the second side of the sheet based on the position data; and
control a mechanical system to print the second side of the sheet at the corrected position.

2. An image forming apparatus, comprising:
an engine including a writer to print the first image and the second image on the first side and the second side of the sheet, and circuitry to:
receive the first image data from a digital front end;
determine whether the first image data includes K component image data;
in response to determining that the first image data includes K component image data, decompress the first image data and add a positioning element to the K component image data;
in response to determining that the first image data does not include K component image data, generate K component dummy image data and add the positioning element to the K component dummy image data;
receive position data from a sensor configured to detect the positioning element on the first side of the sheet;
determine a corrected position of the second side of the sheet based on the position data; and
control a mechanical system to print the second side of the sheet at the corrected position.

3. An information processing method, the method comprising:
receiving first image data;
determining whether the first image data includes K component image data;
in response to determining that the first image data includes K component image data, decompressing the first image data and adding a positioning element to the K component image data;
in response to determining that the first image data does not include K component image data, generating K component dummy image data and adding the positioning element to the K component dummy image data;
receiving position data from a sensor configured to detect the positioning element on the first side of the sheet;
determining a corrected position of the second side of the sheet based on the position data; and
controlling a mechanical system to print the second side of the sheet at the corrected position.

* * * * *